Sept. 9, 1952     J. D. MARCELLUS     2,609,551
TAP HOLDER
Filed Nov. 4, 1948     2 SHEETS—SHEET 1
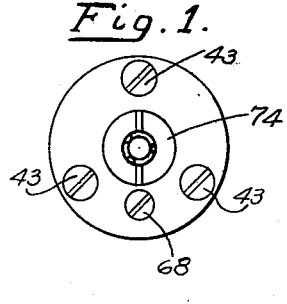
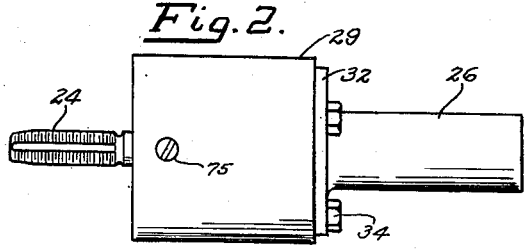
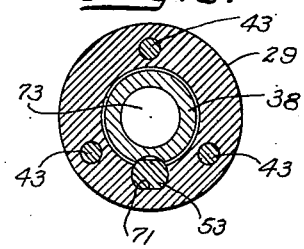
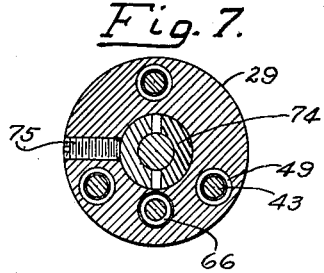
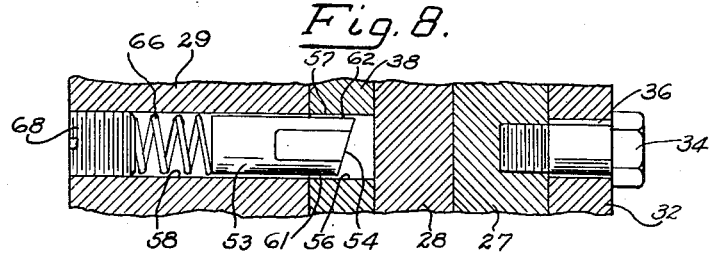
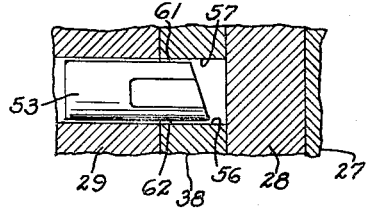
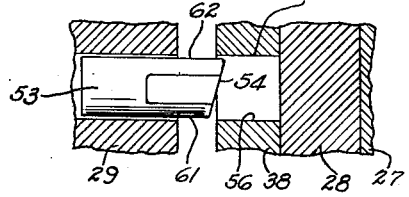
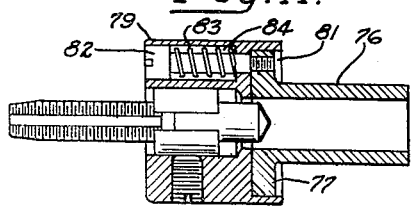
INVENTOR
James D. Marcellus
BY
McCanna and Morsbach
ATTORNEY Sept. 9, 1952  J. D. MARCELLUS  2,609,551
TAP HOLDER
Filed Nov. 4, 1948  2 SHEETS—SHEET 2
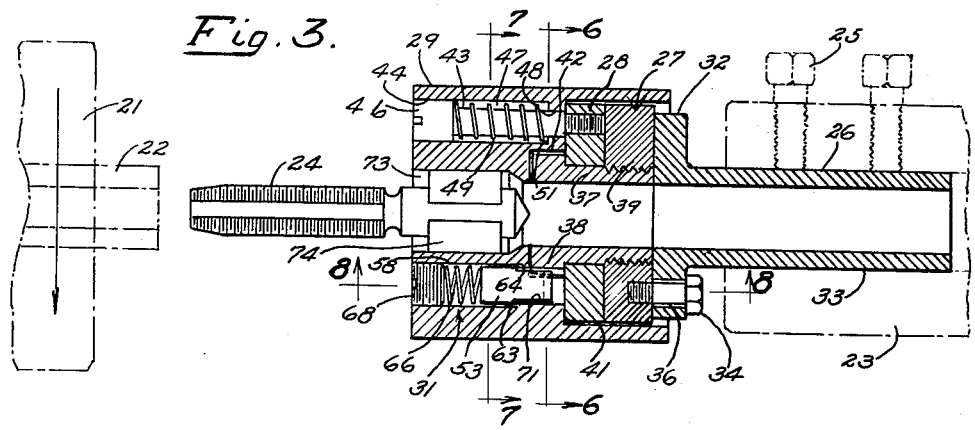
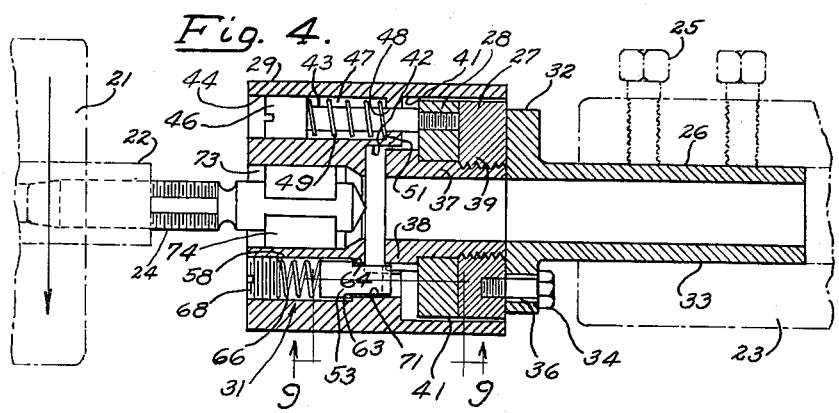
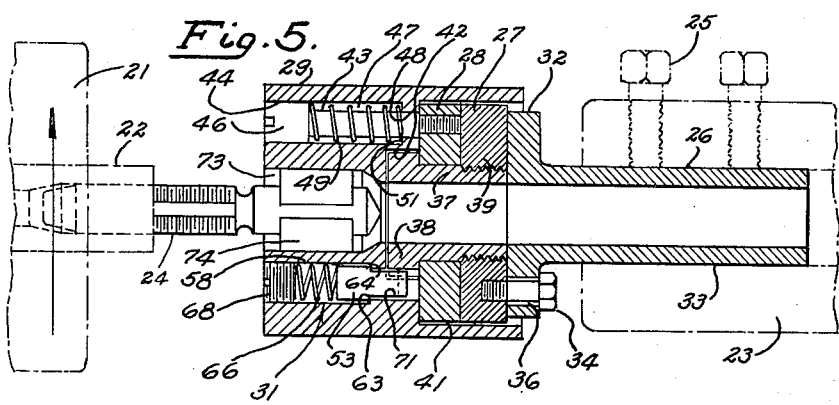
INVENTOR
James D. Marcellus
BY
McCanna and Morsbach
ATTORNEY Patented Sept. 9, 1952

2,609,551

UNITED STATES PATENT OFFICE 2,609,551

TAP HOLDER

James D. Marcellus, Belvidere, Ill.

Application November 4, 1948, Serial No. 58,237

11 Claims. (Cl. 10—89)

This invention relates to tool holders and more particularly to releasing chucks or holders for taps and the like.

An object of the invention is to provide a tap holder for use in a machine in which a tap is forcibly fed to a rotating workpiece with novel means for effecting limited relative feed movement of the tap with the workpiece when the force feed movement of the tap is stopped at the conclusion of the tapping operation.

Another object of the invention is the provision in a tap holder comprising a body portion and a head movable between preselected axial positions to permit limited relative feed movement between a tap and a workpiece under the conditions described above with novel clutch means acting between the body and the head that maintains the head and body in fixed relation in one axial position of the head and that permits the head to rotate in unison with the workpiece, in one direction of rotation only, when the head is in the other axial position.

Another object of the invention is the provision in a tap holder of the above character of novel clutch means that may be readily reversed so that a single tap holder may be used for forming either right hand or left hand threads on a workpiece.

Yet another object of the invention is to provide a tap holder of the above character wherein the length of a tap protruding from the holder may be readily controlled so that breakage of the tap is minimized.

Still another object of the invention is to provide a tap holder of the above character comprising a tap holding portion and a shank portion with novel means of securing the tap holding portion to the shank portion which permits of limited relative movement of the tap holding portion with respect to the shank to facilitate alinement of a tap with a workpiece.

Yet another object of the invention is to provide a tap holder of the above character comprising a tap holding portion and a shank portion with novel means of securing the tap holding portion to the shank portion wherein strains and stresses between parts caused by securing the shank portion in a tool holder are minimized in the tap holding portion.

Other objects and advantages of the invention will become apparent from the following detailed description taken in connection with the accompanying drawings, in which:

Figure 1 is an end view of a tap holder embodying the present invention, having a tap mounted thereon;

Fig. 2 is a side elevational view of the tap holder and tap shown in Figure 1;

Fig. 3 is an elevational view taken along the longitudinal axis of a machine tool showing the tap holder in section with a tap disposed in the approach position with respect to a workpiece;

Fig. 4 is a view similar to Fig. 3 with the head of the tap holder moved relative to the body at the conclusion of the tapping operation;

Fig. 5 is a view similar to Fig. 3 showing the position of the parts during the tap removing stage of the operation with the head and tap in their retracted positions;

Fig. 6 is a sectional view taken along the line 6—6 of Fig. 3;

Fig. 7 is a sectional view taken along the line 7—7 of Fig. 3;

Fig. 8 is an enlarged fragmentary sectional view taken along the line 8—8 of Fig. 3;

Fig. 9 is a view similar to Fig. 8 showing the position of the clutch pin corresponding to the positions of the head and body shown in Fig. 4;

Fig. 10 is a view similar to Fig. 8 with the clutch pin a reverse position, and

Fig. 11 is a modified form of the invention.

Referring now to the drawings, the invention is shown embodied in a releasing chuck or tap holder for use in a conventional hand operated screw machine. To simplify the drawings only a support 21 for a workpiece 22 and a tool holder 23 for the tap holder of the screw machine are shown. In normal operation the work support 21 rotates in the direction indicated by the arrow in Fig. 3 and the tool holder 23 carrying the tap 24 is fed axially toward the workpiece 22 to form the desired threads on the workpiece 22. After the threading operation the workpiece 22 is caused to rotate in the opposite direction to effect the removal of the tap 24.

In the embodiment of the invention shown in Figs. 1–10 the tap holder in general comprises a support or shank 26, a body portion 27 adapted to be secured to the shank 26, a rigid member 28 rotatably mounted on the body 27, a head 29 for chucking the tap 24 mounted on the member 28 to have limited axial movement with respect to the body 27 and clutch means 31 acting between the head 29 and the body 27 to maintain the head in fixed relation with the body in one axial position of the head and to permit relative rotational movement of the head with respect to the body 27 in one direction of rotation in another axial position of the head. The shank 26 comprises a disc portion 32 and a shaft portion 33 shaped to be chucked in the tool holder 23. Radially disposed set screws 25 secure the shaft portion 33 in position in the holder 23 so that the tap holder is in an operative position. The disc portion 32 is formed with a flat axial surface shaped to provide a seat for the body 27. Mounting bolts 34 extending through annularly spaced holes or apertures 36 in the flange 32 and received in threaded openings in the body 27 secure the body to the shank 26 in a rigid relation. Preferably the apertures 36 in the flange 32 through which the mounting bolts 34 extend are made of slightly larger diameter than the mounting bolts so that when the bolts are in a loosened position, the body 27 and head 29 of the tap holder may be moved relative to the shank 26. This construction is advantageous in facilitating the set-up of the tap holder since it permits of limited adjustment whereby the axis of the tap 24 may be shifted to facilitate the making of small adjustments in alinement with respect to the workpiece 22. The above construction is also advantageous from the standpoint that any clamping stresses in the shank 26 resulting from securing the shank 26 in the tool holder are prevented from being transmitted to the head 29 to interfere with the operation of the clutch means 31 or movement of the head 29.

The body 27 comprises a sleeve portion 37 and an annular flange 38 formed at one end for a purpose to presently appear. At its opposite end the sleeve portion 37 is threaded for the reception of a disc 39. The flange 38 and disc 39 in effect form spaced shoulders or abutments on opposite sides of a central portion of the sleeve 37. The member 28 in this instance is in the form of an annular disc shaped to be rotatably mounted on the body 27 intermediate the flange 38 and the disc 39. The member 28 is of somewhat larger diameter than the annular flange 38 and is of substantially the same diameter as the disc 39.

The head 29 comprises a generally cylindrical shaped portion having a recess 41 at its rear end shaped to receive the disc 39 and rigid member 28, and a recess 42 in communication with the recess 41 shaped to receive the annular flange 38. The head 29 is mounted on the member 28 so as to have limited axial movement with respect thereto between preselected positions. As shown the head 29 is secured to the member 28 by annularly spaced screws 43 threaded into the member 28 and extending through axially disposed passageways 44 formed in the head. The head 46 of each screw is preferably shaped to fit snugly in the passageway 44. The body portion 47 of each screw is smooth and shaped to pass through a narrowed portion 48 at the inner end of each passageway 44 adjacent the rigid member 28. Preferably the fits between the respective parts should be such that the screws 43 also serve as guides for the head 29 in its axial movement. As shown one end of a spring 49 abuts against the head 46 of each screw 43 and the opposite end abuts against a shoulder 51 formed at the inner end of the passageway 44. The force of the spring normally urges the head 29 into abutting relation with the rigid member 28.

Novel clutch means 31 acts between the head 29 and the body 27 to maintain the head and body in fixed rigid relation when the head 29 is adjacent the body 27 and permits the head to rotate in one direction relative to the body when the head 29 is in spaced relation to the body 27 but prevents relative rotation of the head with respect to the body in the opposite direction of rotation. In this embodiment of the invention the clutch means 31 comprises an axially disposed resiliently mounted pin or clutch dog 53 (see Figs. 3 and 8) having a pre-shaped end 54 disposed between spaced shoulders 56 and 57 formed on the flange or clutch plate 38 of the body 27 so that in the retracted position of the head 29 the pin 53 engages the shoulder 56 to maintain the head 29 and body 27 in a rigid assembled relation and in another position of the head 29 clears the shoulder 56 to permit relative rotational movement of the head with respect to the body in one direction of rotation but engages the shoulder 57 upon change in direction of rotation of the head to hold the head 29 and body 27 in fixed relation.

The shoulders 56 and 57 in the present instance are formed by removing a portion of the periphery of the flange 38. The pin 53 is disposed in an axially extending passageway 58 formed in the head 29 and has its end portion 54 projecting outwardly from the head into the recess 42 so that the end 54 of the pin 53 is disposed between the shoulders 56 and 57 with a forward edge 61 of the pin adjacent the shoulder 56 and a rear edge 62 of the pin adjacent the shoulder 57 as shown in Fig. 8. The extreme outer end of the pin is inclined away from the forward edge 61 toward the rear edge 62 so that the end of the pin in effect forms a cam surface. Thus, when the head 29 has moved axially a predetermined distance the end 54 is cammed or forced up over the shoulder 56. Under these conditions the head 29 is free to turn in a clockwise direction of rotation relative to the body 27 due to the ratcheting of the pin relative to the shoulder 56. In the event of the reversal of direction of rotation, the rearward edge 62 engages the shoulder 57 and prevents relative rotation of the head.

At its opposite end the pin 53 is formed with spaced shoulders 63 (see Fig. 3) shaped to engage a stop or shoulder 64 formed at the inner end of the passageway 58 to limit inward movement of the pin. The pin 53 is normally urged to its inner or engaged position by a spring 66. The spring is disposed between an end of the pin 53 and a plug 68 threaded into the end of the passageway 58. The spring pressure on the pin 53 may be readily adjusted by varying the position of the plug 68 in the passageway 58. To prevent rotation of the pin 53 the pin is formed with spaced parallel sides 71 shaped to be disposed in a corresponding complementary shaped end of the passageway 58. The above construction and disposition of the parts permits the formation of right hand threads on the workpiece 22 when the work holder support 21 is rotated in the direction of rotation as indicated by the arrow in Fig. 3. When it is desired to form left hand threads the direction of rotation of the workpiece is reversed and the plug 68 is removed and the pin 53 is withdrawn and rotated 180 degrees after which it is reinserted in the passageway 58 in the head so that the forward edge 61 is adjacent the shoulder 57 and the rear edge 62 is adjacent the shoulder 56 (see Fig. 10). While this embodiment of the invention shows only one pin or clutch dog 53 it is readily apparent to those skilled in the art that any number of pins 53 may be used.

The head 29, the body 27 and the shank 26 are formed with centrally disposed alined openings to define an axially extending passageway 73 shaped to receive the tap 24. The passageway 73 at its outer end is somewhat larger and is shaped to receive the tap holding shims 74 of conventional construction. A set screw 75 is utilized for clamping the shims and the tap 24 in an operative position. With this construction the tang end of the tap 24 may be inserted into the passageway 73 as far as desired so that only the extreme outer end of the tap protrudes from the holder. This construction is advantageous in that breakage of taps is held to a minimum since the length of the tap, i. e., distance between work support 21 and the tap holder is readily controlled. Moreover, broken taps may be used. In such cases the broken end of a tap may be inserted in the passageway 73 and the shims clamped down on the body portion of the tap. This construction thus assures the operator the maximum use of a tap.

The embodiment of the tap holder shown in Fig. 11 is intended primarily for use with automatic screw machines and is of the non-releasing type. In general it includes a shank 76 comprising a disc portion 77 and a shaft portion 78, formed as described for the embodiment shown in Figs. 1–10, and a head 79 mounted on the shank 76 for limited axial movement. The head portion 79 in this embodiment of the invention comprises a cylindrical body having a recess 81 at one end shaped to receive the disc portion 77. Annularly spaced screws 82 secure the head 79 to the disc portion 77 in the same manner as the head 29 is secured to the rigid member 28 in the embodiment shown in Figs. 1–10. A spring 83 disposed in each axially extending passageway 84, formed in the head for the screws 82, and acting between the respective screw and the head 79 urges the head to one axial position as described for the embodiment shown in Figs. 1–10.

The operation of the tap holder is best understood by reference to Figs. 3, 4 and 5. In Fig. 3 the workpiece 22 is rotating in a counterclockwise direction and the tap 24 is being fed axially and is approaching the workpiece 22. The head 29 is in its retracted position, abutting against the body 28 and the pin 53 is in its engaged position to prevent the head 29 from rotating. The parts remain in this position until the end of the tapping operation. At the end of the tapping operation the axial movement of the tool holder 23 is arrested and the direction of rotation of the workpiece 22 is reversed to remove the tap 24. Due to inertia of the parts the workpiece 22 continues to rotate relative to the tap 24 after the axial feed movement of the tool holder is arrested and before the direction of rotation of the workpiece is reversed. During this interval the head 29 and tap 24 move relative to the workpiece 22 a limited amount to prevent damage to the formed threads. When the head 29 reaches the axial position in which the edge 61 of the pin 53 disengages the shoulder 56 (see Fig. 9), the end 54 ratchets past the shoulder 56. Thus, after a limited relative axial feed movement the head 29 and tap 24 are free to rotate in a counterclockwise direction in unison with the workpiece 22. Fig. 4 shows the parts in the above position. When the direction of rotation of the workpiece 22 is reversed the tap 24 is unthreaded from the workpiece 22. Upon change in direction of rotation of the workpiece, the rearward edge 62 of the pin 53 engages the shoulder 57 to prevent rotational motion of the head 29 and tap 24. The workpiece 22 thus rotates to unthread the tap 24. During the initial unthreading movement the springs 49 act to move the head 29 from its extended position as shown in Fig. 4 to its retracted position as shown in Fig. 5 in which the pin 53 is moved to its engaged position. As soon as the tap 24 clears the workpiece 22 the work support 21 is stopped, the finished workpiece 22 is removed and another blank workpiece 22 is mounted on the support 21. The machine is then ready for another tapping operation. It will be seen that by inserting the pin 53 with the preshaped sloping end 54 disposed in the opposite direction the tool is arranged for tapping left hand threads and by substituting a longer pin without the sloping end 54 the tool becomes non-releasing.

The embodiment shown in Fig. 11 operates in a similar manner. In automatic screw machines the reversing of direction of rotation of the workpiece 22, however, is controlled to a finer degree than in hand operated screw machines. Accordingly, clutch means are not required between the head 79 and the shank 76. With the exception that the clutch means is omitted in the construction shown in Fig. 11 the operation is the same as that described for the embodiment shown in Figs. 1–10.

I claim:

1. A releasing tap holder comprising a body portion having spaced shoulders, a rigid member rotatably mounted between said spaced shoulders, a head for chucking a tap, means for mounting said head on said rotatable member permitting limited axial movement of the head with respect to the rotatable member between preselected positions, clutch means resiliently mounted on said head in one position of the head acting between said head and one of said shoulders to maintain said head in fixed relation with the body and in another position of the head permitting relative rotational movement of the head in one direction of rotation and preventing rotational movement of the head in the opposite direction, and a shank portion forming a seat for said other shoulder and shaped to be received in a tool holder to support said body and head in an operative position in a machine tool.

2. The combination recited in claim 1 wherein means is provided for mounting the body on the shank in which the axis of the body is limitedly movable relative to axis of the shank to facilitate alinement of the tap with a workpiece.

3. The combination recited in claim 1 with means for attaching the body portion to the shank portion for adjustment transversely of the axis thereof to prevent stresses and strains due to clamping the shank portion in a tool holder from being transmitted to the head and body portion.

4. A releasing tap holder comprising a body, a rigid member rotatably mounted on said body, a head for chucking a tap, means for mounting said head on said rotatable member permitting limited axial movement of the head with respect to the rotatable member between preselected positions, clutch means acting between the head and the body, said clutch means in one position of the head maintaining said head in fixed relation with the body and in another position of the head permitting relative rotational movement of the head in one direction of rotation only, a shank portion shaped to be received in a tool holder, and means for securing the body to the shank portion permitting adjustment of the body transversely of the axis of the shank whereby stresses set up in the shank portion due to clamping the latter in the tool holder are prevented from being transmitted to the body and head.

5. In a releasing type tap holder, the combination of a body portion having spaced shoulders, one of said shoulders having a plurality of axially facing threaded openings, a rigid member rotatably mounted on said body between said spaced shoulders, a head for chucking a tap and the like, means for mounting said head on said rotatable member to effect limited axial movement of the head with respect to the rotatable member between preselected positions, clutch means acting between said head and one of said shoulders to maintain said head in fixed relation with the body in one position of the head and to permit relative rotational movement of the head in one direction of rotation in the other position of the head, a shank comprising a shaft portion extending axially of the body and a disc portion, said disc portion having a plurality of axially facing apertures, and threaded means extending through said openings in the disc to be received in said openings in said one shoulder for rigidly securing the body to the shank, said threaded means having a smaller diameter than the openings in the disc portion to effect limited relative transverse movement of the body with the disc portion when the threaded means are loosened.

6. In a tap holder, the combination of a body portion having spaced shoulders and having an axially extending passageway, a rigid member rotatably mounted on said body between said spaced shoulders, a head having an axial passageway for receiving and chucking a tap, means for mounting said head on said rotatable member to effect limited axial movement of the head with respect to the rotatable member between preselected positions, resiliently mounted clutch means acting between said head and one of said shoulders to maintain said head in fixed relation with the body in one position of the head and to permit relative rotational movement of the head in one direction of rotation in the other position of the head, and a shank portion forming a seat for said other shoulder and shaped to be received in a tool chuck to support said body and head, said shank having a passageway in alinement with and communicating with said passageway in the head and the body for receiving the end of a tap, whereby the length of the tap protruding from the head is readily controlled.

7. In a tap holder, the combination of a body portion having spaced abutments, one of said abutments being formed with spaced shoulders on its periphery, a rigid member rotatably mounted on said body between said spaced abutments, a head for chucking a tap or the like having an axially extending passageway in one angular position of the head being disposed adjacent the shoulders, means for mounting said head on said rotatable member to effect limited axial movement of the head with respect to the rotatable member between preselected positions, and a resiliently mounted pin extending through said passageway in said head shaped to engage said shoulders in one axial position of the head to maintain the head and body in rigid relation, said pin being formed with a cam surface at its free end disposed in the other axial position of the head to engage one of said shoulders upon relative rotation of the head and body to be retracted thereby to permit said rotation of the head with respect to the body, said pin also being formed with a surface normal to the path of relative rotation of the head and body in the reverse direction disposed to engage the other shoulder in the event of reversal of direction of rotation of the head to secure the head and body in a rigid relation.

8. In a tap holder, the combination of a body portion having spaced abutments, one of said abutments being formed with spaced shoulders on its periphery, a rigid member rotatably mounted on said body between said abutments, a head for chucking a tap and the like adjacent said one abutment having an axially extending passageway, a portion of said passageway being formed with substantially spaced parallel sides to form a guide, resilient means for mounting said head on said rotatable member to effect limited axial movement of the head with respect to the rotatable member between preselected positions, an axially movable pin extending through said passageway having a narrowed portion disposed in said guide means for maintaining said pin in a preselected position, said pin having its end formed with a cam surface, and resilient means for urging said pin to position the cam surface between said shoulders, in one position of said head said cam surface being engageable with one of said shoulders to maintain the head and body in rigid relation and in the other position of the head disengaging said one of said shoulders to effect relative rotation of the head in one direction of rotation and engageable with the opposite shoulder when the direction of rotation of the head is changed to maintain the head and body in a rigid relation.

9. The combination recited in claim 8 wherein the pin is rotatable 180 degrees to reverse the position of the cam surface in the holder whereby the end of the pin engages the shoulders in a reverse manner to that described.

10. In a tap holder, the combination of a body portion having spaced abutments, one of said abutments being formed with a notch on its periphery to define spaced shoulders, a rigid member rotatably mounted on said body between said abutments, a head for chucking a tap and the like having an axially extending passageway disposed in axial alinement with said notch, said passageway adjacent said abutment being formed with substantially spaced parallel side walls to form a guide, resilient means for mounting said head on said rotatable member to effect limited relative axial movement of the head with respect to the rotatable member between preselected positions, an axially movable pin extending through said passageway having a narrowed portion disposed in said guide means for maintaining said pin in a preselected position, said pin having one end formed with a forward edge, a rearward edge and an inclined surface interconnecting said edges, and resilient means for urging said pin to a position in which said end is disposed between said shoulders, in one position of the head said forward edge being engageable with one of said shoulders to maintain the head and body in fixed relation and in the other position of the head said inclined surface being cammed against said one shoulder to move the pin axially to permit relative rotational movement of the head and said rearward shoulder being operative upon reversal of direction of rotation of said head to engage the other shoulder and to maintain the head and body in a rigid relation.

11. In a tap holder, the combination of a body portion having an axial passageway, a rigid member rotatably mounted on said body portion, a head having an axial passageway for receiving and chucking a tap communicating with the axial passageway in the body portion and extending in alignment therewith from one end thereof, means for mounting said head on said rotatable member for limited axial movement of the head with respect to the rotatable member between preselected positions, clutch means acting between the head and the body portion, said clutch means in one position of the head maintaining the head in fixed relation with the body portion and in another position of the head permitting relative rotational movement of the head in one direction of rotation only, and a shank portion attached to the body portion and shaped to be received in a tool holder to support said body portion and head, said shank having a passageway aligned with and communicating with the other end of said passageway in the body portion to permit reception of the end of a tap therein.

JAMES D. MARCELLUS.

REFERENCES CITED

The following references are of record in the file of this patent:

UNITED STATES PATENTS

| Number | Name | Date |
|---|---|---|
| 529,169 | Hartness | Nov. 13, 1894 |
| 1,346,295 | Burger | July 13, 1920 |
| 2,087,084 | Cote | July 13, 1937 |
| 2,281,416 | Cote | Apr. 28, 1942 |
| 2,333,868 | Kylin | Nov. 9, 1943 |
| 2,363,379 | Allen | Nov. 21, 1944 |
| 2,392,809 | Cote | Jan. 15, 1946 |
| 2,512,780 | Spisak | June 27, 1950 |

FOREIGN PATENTS

| Number | Country | Date |
|---|---|---|
| 11,829 | Great Britain | A. D. 1910 |
| 115,694 | Great Britain | May 16, 1918 |
| 139,199 | Great Britain | Dec. 9, 1920 |